(12) United States Patent
Hardwicke et al.

(10) Patent No.: US 8,408,003 B2
(45) Date of Patent: Apr. 2, 2013

(54) COMBINED CYCLE POWER PLANT

(75) Inventors: Canan Uslu Hardwicke, Simpsonville, SC (US); Sal Albert Leone, Scotia, NY (US); Thomas Francis Taylor, Greenville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 12/265,228

(22) Filed: Nov. 5, 2008

(65) Prior Publication Data

US 2010/0107595 A1 May 6, 2010

(51) Int. Cl.
*F02C 1/00* (2006.01)

(52) U.S. Cl. ........................... 60/772; 60/39.182

(58) Field of Classification Search ........... 60/39.182, 60/772, 670; 122/31.1, 32.511, DIG. 13; 165/157, 158, 181, 907
See application file for complete search history.

(56) References Cited

U.S. PATENT DOCUMENTS

| | | | | |
|---|---|---|---|---|
| 3,095,255 A | * | 6/1963 | Smith | 62/512 |
| 3,442,324 A | * | 5/1969 | Clay, Jr. et al. | 165/283 |
| 3,543,843 A | * | 12/1970 | Gunter | 165/111 |
| 5,441,716 A | * | 8/1995 | Rockenfeller | 423/299 |
| 6,019,070 A | * | 2/2000 | Duffy | 122/209.1 |
| 6,234,245 B1 | | 5/2001 | Reid et al. | |
| 6,499,302 B1 | | 12/2002 | Ranasinghe | |
| 6,709,739 B1 | * | 3/2004 | Mullen et al. | 428/313.9 |
| 2004/0069244 A1 | * | 4/2004 | Schroeder | 122/406.4 |
| 2005/0076644 A1 | | 4/2005 | Hardwicke et al. | |
| 2006/0096750 A1 | * | 5/2006 | Meuzelaar | 165/181 |
| 2009/0107651 A1 | * | 4/2009 | Meuzelaar | 165/51 |
| 2010/0186443 A1 | * | 7/2010 | Zhang et al. | 62/515 |

OTHER PUBLICATIONS

John Banhart, "Manufacturing Routes for Metallic Foams", JOM, 52 (12) (2000), pp. 22-27.
Don Floyd, Mechanical Properties of Open Cell Sintered Iron Based Porous Metal Structures, pp. 1-18, Jul. 2001.
David P. Haack, Kenneth R. Butcher, T. Kim, and T. J. Lu, Novel Lightweight Metal Foam Heat Exchangers, pp. 1-7, Porvair Fuel Cell Technology Inc., Hendersonville, NC, USA, Department of Engineering, University of Cambridge, Cambridge, UK. 2001.

* cited by examiner

*Primary Examiner* — Phutthiwat Wongwian
(74) *Attorney, Agent, or Firm* — Cantor Colburn LLP

(57) ABSTRACT

A combined cycle power plant includes at least one gas turbine, at least one steam turbine and a heat recovery boiler in combination to produce electricity and/or process steam. The heat recovery boiler has a duct for receiving and confining gas turbine exhaust gas from the gas turbine. Heat transfer tubes for heating water and steam for use in the bottoming steam cycle (steam turbine and/or process steam) are disposed within the heat recovery boiler and have exterior surfaces in fluid communication with the gas turbine exhaust gas and interior surfaces in circulatory fluid communication with water and/or steam. A cellular material is attached to the exterior surfaces of the heat transfer tubes and operates to enhance heat transfer from the gas turbine exhaust gas to the water and/or steam.

8 Claims, 5 Drawing Sheets

US 8,408,003 B2

COMBINED CYCLE POWER PLANT

BACKGROUND OF THE INVENTION

The subject matter disclosed herein relates to a combined cycle power plant and, more particularly, to the heat recovery boiler with enhanced heat transfer surface area for improved combined cycle performance and economics. The subject matter applies to a single shaft, combined cycle power plant, a multi-shaft, combined cycle power plant and a cogeneration power plant. In addition the subject matter may be applicable to natural circulation, forced circulation and once through heat recovery boilers configured with horizontal and/or vertical heat transfer tubes with gas turbine exhaust flow in either a horizontal and/or vertical direction. The heat recovery boiler tube arrangement may be in-line or staggered and the heat recovery boiler may be unfired or supplementary fired.

Combined cycle power plants utilize at least one gas turbine, at least one steam turbine and heat recovery boilers in combination to produce electricity and/or to process steam. The power plant is arranged such that the gas turbine is thermally connected to the steam turbine and/or process steam system through a heat recovery boiler such as a Heat Recovery Steam Generator ("HRSG"). The HRSG is essentially a large duct with water/steam filled heat exchanger tube bundles interposed therein. Feed water enters an economizer and circulates through the tube bundles such that the water is converted to steam as the gas turbine exhaust gas passes through the duct and over the tube bundles. The combined cycle power plant derives its thermal efficiency from the use of the heat rejected from the gas turbine as a supply of energy for the steam bottoming cycle (steam turbine and/or process steam). The performance and economics of the HRSG is directly related to the efficiency of heat transfer between the gas turbine exhaust gas (hot side) and the water/steam in the tube bundles (cold side). HRSGs typically utilize finned type tubes (solid and serrated) to enhance the rate of heat transfer from the gas turbine exhaust gas to the water/steam in the tube bundles however, overall heat transfer is limited by the heat transfer surface area which is located within the duct of the HRSG and the need to maintain reasonable flow characteristics and pressure drop of the gas turbine exhaust gas.

It is therefore desired to provide a combined cycle power plant that is configured to have increased performance and economics through the improvement of heat transfer in the HRSG.

BRIEF DESCRIPTION OF THE INVENTION

A combined cycle power plant includes a gas turbine and a steam turbine that are thermally connected by a heat recovery steam generator. The heat recovery steam generator includes a duct for receiving and confining gas turbine exhaust gas from the gas turbine. Heat transfer tubes are disposed within the duct and have exterior surfaces in fluid communication with the gas turbine exhaust gas and interior surfaces in circulatory fluid communication with water and steam. A cellular material is attached to the exterior surfaces of the heat transfer tubes and operates to enhance heat transfer from the gas turbine exhaust gas to the water and/or steam.

A method of configuring a combined cycle power plant heat recovery steam generator may comprise the steps of configuring a duct to receive and confine gas turbine exhaust gas. Disposing a series of heat transfer tubes in the duct that are configured to receive water and/or steam and applying a cellular material to the exterior surfaces of the heat transfer tubes.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1:
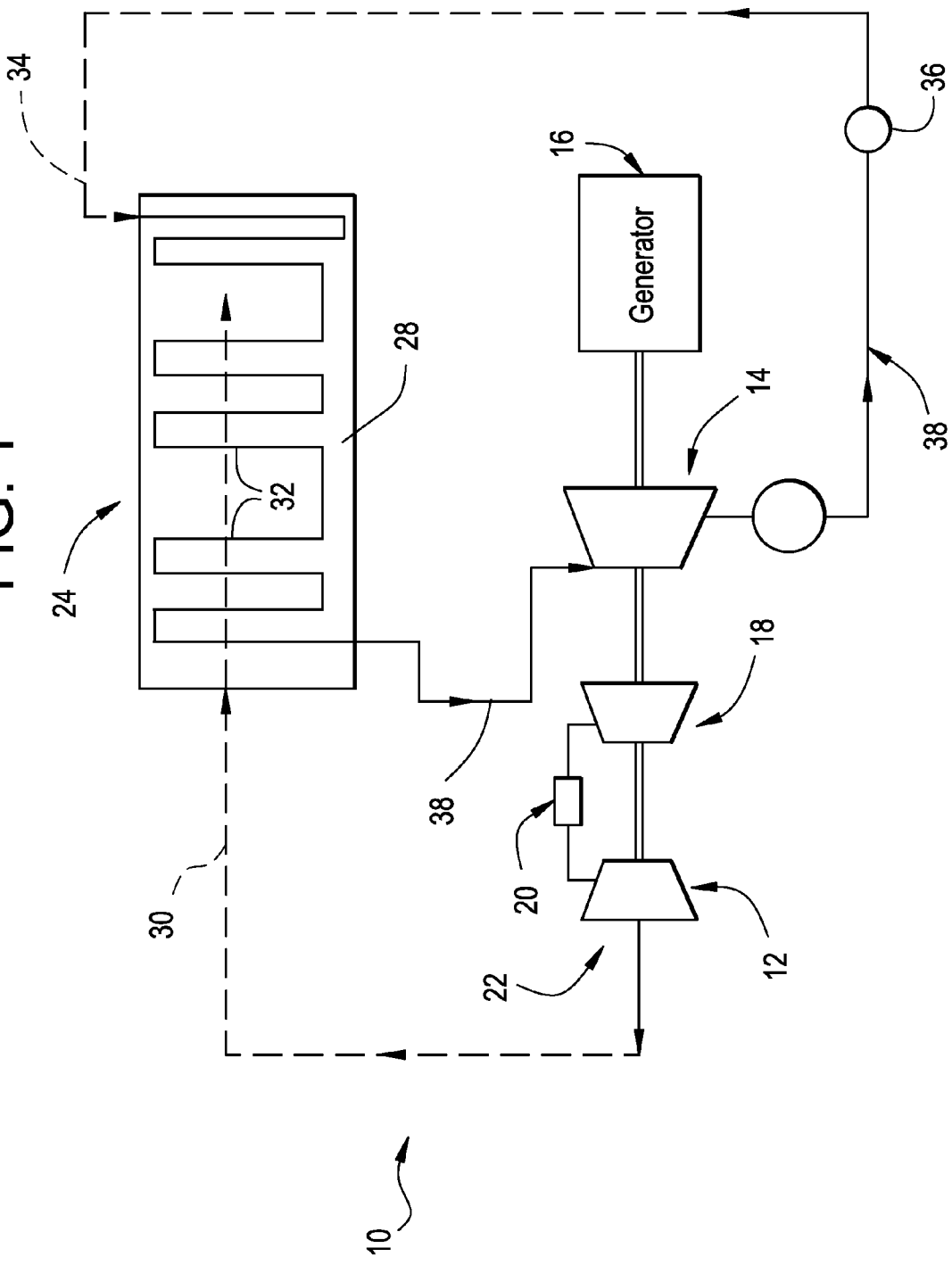
FIG. 1 is a schematic view of a single shaft, combined cycle power plant embodying the present invention.

Referring now to the drawings, in which like numerals indicate like elements throughout the views, FIG. 1 shows an exemplary embodiment of a single shaft, combined cycle power plant 10. The combined cycle power plant includes a gas turbine system 12, a steam turbine system 14 and a generator 16 that is driven by the gas and steam turbines to generate electricity. The gas turbine system includes, in serial flow communication, a multistage axial compressor 18, a combustor 20, and a multi-stage turbine 22. The gas turbine system 12 and the steam turbine system 14 are thermally connected through HRSG 24. The HRSG 24 is a heat exchanger configured to include a duct 28 for receipt and confinement of gas turbine exhaust gas 30 exiting the multistage turbine 22. Bundles of heat transfer tubes 32 are disposed within the duct 28 of the HRSG 24 and are adapted to receive feed water 34 (condensate from steam turbine condenser 15) that is circulated through the tubes by the feed water pump 36. As the feed water 34 passes through the heat transfer tubes 32, heat from the gas turbine exhaust gas 30 passing through the HRSG duct 28 is transferred to the water, creating steam. The steam is supplied to, and drives, the steam turbine 14, through the main steam piping 38. In addition, the steam from the HRSG may also be supplied to a process steam system (not shown).

Figure 2:
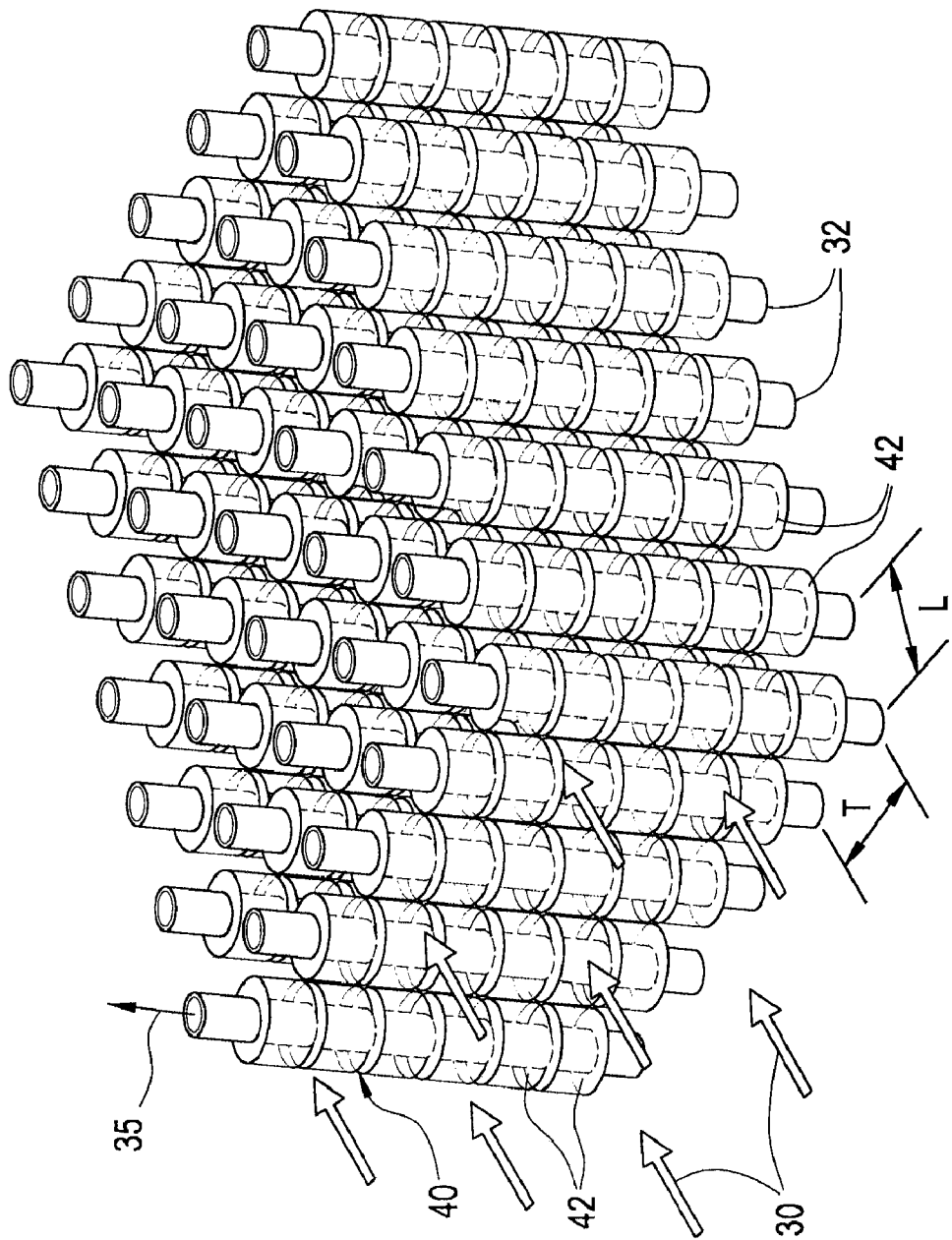
FIG. 2 is an illustration of a portion of heat transfer tubes of the combined cycle power plant HRSG of FIG. 1.

Within the duct 28 of HRSG 24 the exterior of the heat transfer tubes 32 represent the "hot side" surface area while the interior, or wet side, of the heat transfer tubes represent the "cold side" surface area. Enhanced transfer of heat between the hot and cold side surface areas of the HRSG will operate to increase the performance and economics of the combined cycle power plant 10. Referring to FIG. 2, a portion of the heat transfer tubes 32 is shown. In an exemplary embodiment of the invention a cellular material, such as metal foam extended surface 40, surrounds the heat transfer tubes 32. The metal foam extended surface is comprised of a relatively new class of materials having low density, high surface area and good strength. The metal foam extended surface may be formed from various powder metals and, with varying porosity.

Controlling the material properties and configuration of the metal foam extended surface 40 is an important aspect of the invention in that the pressure drop of the gas turbine exhaust gas 30 passing through the HRSG duct 28 is a consideration in the design of the HRSG. High pressure drops across the bundles of heat transfer tubes 32 will reduce the power output of the gas turbine system 12. As indicated in the plot shown, studies show that metal foam with appropriate porosity and density, which relates directly to pressure drop, can achieve lower pressure drop. Additionally, due to the unique structural characteristics of the metal foam, it has sound and vibration absorptive characteristics that are useful in relieving acoustical and vibration issues in the HRSG 24 and may allow for reduction or elimination of costly silencers and acoustic baffles used to modify the acoustic characteristics of the HRSG.

Figure 3:
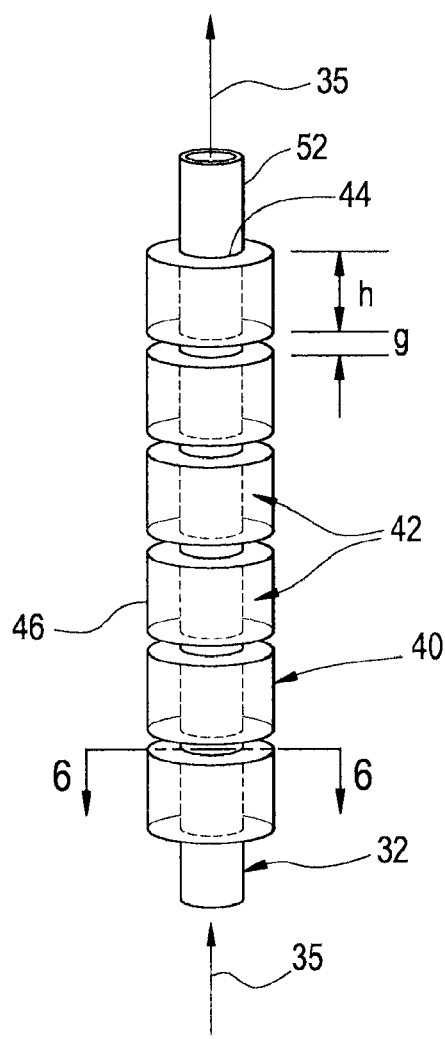
FIG. 3 is an enlarged view of one of the heat transfer tubes illustrated in FIG. 2.
Figure 4:
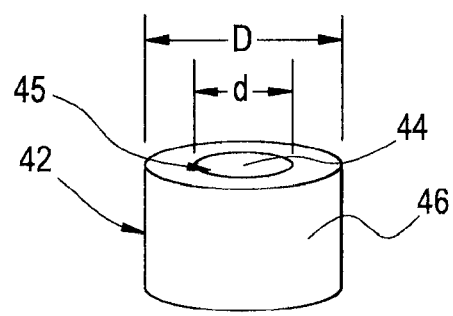
FIG. 4 is an enlarged view of a metal foam segments illustrated in FIG. 2.
Figure 5:
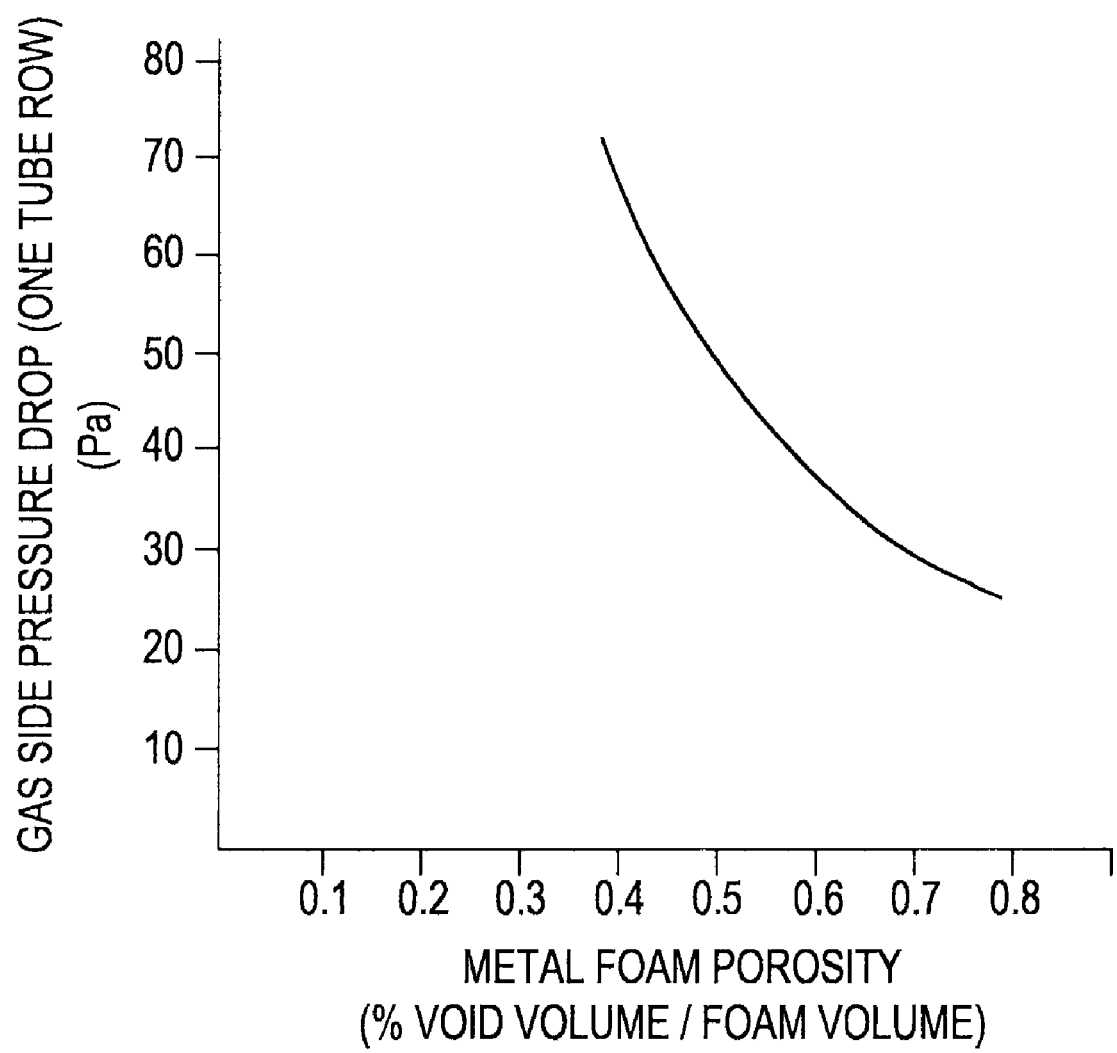
FIG. 5 illustrates the porosity versus back pressure of the metal foam segments of FIG. 4.

Referring to FIGS. 2, 3 and 4, in an exemplary embodiment the metal foam extended surface 40 is defined by a series of metal foam segments 42 having a relatively disc-shaped configuration with an axially extending opening 45 and interior and exterior surfaces 44 and 46, respectively. The axially extending openings have a diameter "d" configured to receive a heat transfer tube 32 therein. The diameter "d" closely matches the outside diameter of the heat transfer tubes 32 such that when a metal foam segment 42 is installed onto a tube, surface area contact between the interior surface 44 of the segment and the outer surface 52 of the heat transfer tube 32 is high. Once mounted on the heat transfer tubes, the metal foam segments 42 are attached using appropriate metallurgical joining techniques such as brazing, welding, diffusion bonding or other suitable methods.

The cylindrical, metal foam segments 42 of the metal foam extended surface 40 operates to increase the rate of heat transfer from the gas turbine exhaust gas passing through the HRSG duct 28 to the water/steam 35 circulating in the heat transfer tubes 32. At the same time, exhaust gas backpressure experienced by the gas turbine can be maintained at acceptable levels. For example, each metal foam segment 42 has an axial height "h" and is preferably spaced from adjacent segments by an axial distance "g". Backpressure within the HRSG duct 28 has been found to fall within a desirable range when the ratio of the metal foam segment height "h" to the segment spacing "g" is within a range of greater than 0 to about 50 (i.e. $0<h/g<50$). In addition, heat transfer reaches satisfactory levels when the ratio of the metal foam segment outer diameter "D" to the segment inner diameter "d" is within a range of about 1.2 to about 10 (i.e. $1.2<D/d<10$).

Figure 6:
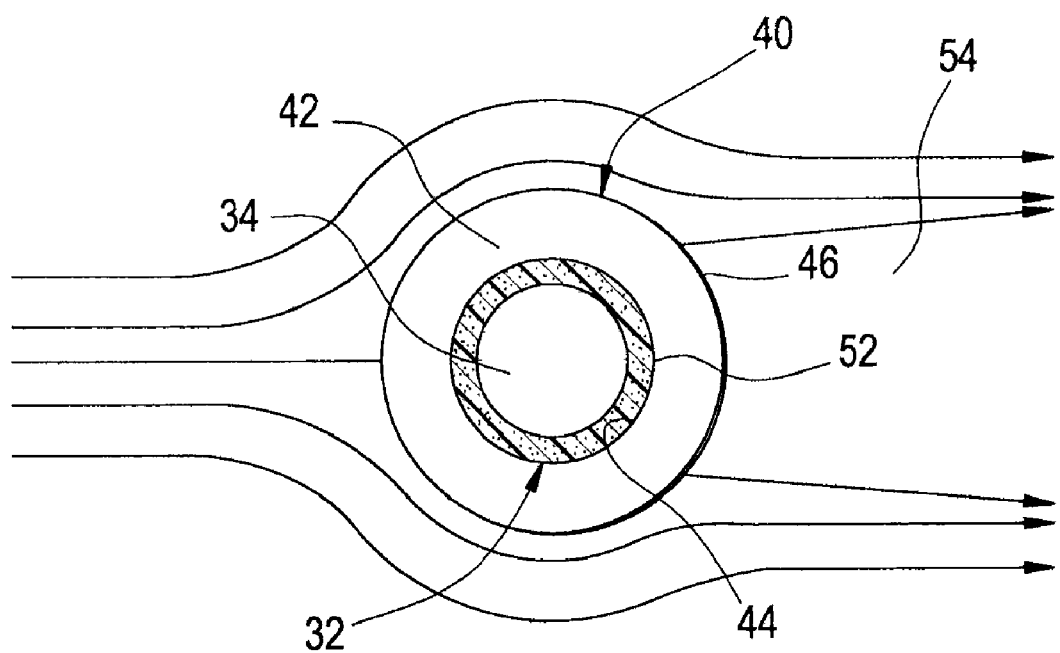
FIG. 6 is a sectional view taken along line 6-6 in FIG. 3 that illustrates the flow performance of the metal foam segments.

As indicated, due to the high surface area of metal foam, the overall heat transfer from the gas turbine exhaust gas 30 to the water/steam 35 is enhanced significantly. Additionally, due to the non-smooth surface characteristics of the metal foam segments 42, FIG. 6, the gas turbine exhaust gas flowing through the HRSG duct 28 will produce a smaller wake area 54, as compared with a conventionally finned tube, due to delayed flow separation. The smaller wake area 54 is a result of a turbulent boundary layer directly adjacent the exterior surface 46 and it operates to reduce backpressure through the HRSG 24. It has been determined that the benefit of delayed flow separation can be achieved when the heat transfer tubes 32 having metal foam extended surfaces are installed in the duct 28 of HRSG 24 such that they have a ratio of frontal spacing "T" (transverse pitch) to metal foam segment outside diameter "D" within the range of about 1.05 to about 2 (i.e. $1.05<T/D<2$), and a ratio of axial spacing "L" (longitudinal pitch) to metal foam segment outside diameter "D" within the range of about 0.2 to about 1.5 (i.e. $0.2<L/D<1.5$).

While the described metal foam segments 42 have been generally described as cylindrical in configuration, the present invention contemplates segments in a variety of shapes and sizes. It is contemplated that the configuration and spacing of the metal foam segments 42 will be selected to efficiently transfer heat to the heat transfer tubes 32 while lowering the gas turbine exhaust backpressure within the duct 28 of the HRSG 24. In addition, while the combined cycle power plant 10 has been described having a single shaft configuration with a single gas turbine, steam turbine and generator, any number of application driven variations are also contemplated. For example it is contemplated that the invention has similar applicability to multiple shaft, combined cycle power plants and cogeneration power plants. The invention may be used in natural circulation, forced circulation and once through HRSGs configured with horizontal and/or vertical heat transfer tubes with gas turbine exhaust gas flow in horizontal and/or vertical directions. The HRSG tube arrangement may be either in-line or staggered and the HRSG may be either unfired or supplementary fired.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A combined cycle power plant including at least one gas turbine and at least one steam turbine thermally connected by a heat recovery steam generator, the steam generator comprising:
    a duct configured to receive and confine gas turbine exhaust gas from the at least one gas turbine;
    heat transfer tubes disposed within the duct and having exterior surfaces for fluid communication with the gas turbine exhaust gas and interior surfaces configured for circulatory fluid communication with water and/or steam; and
    a metal foam cladding having a porous, axially extended surface attached to exterior surfaces of the heat transfer tubes and operable to increase heat transfer from the hot combustion exhaust gas to the water and/or steam, the porous, axially extended surface formed from the metal foam cladding comprising a plurality of axially spaced-apart, axially extended metal foam segments, the spaced apart metal foam segments having an axial height and an axial spacing therebetween, wherein the ratio of the metal foam segment height to the axial spacing therebetween is within a range of greater than 0 to about 50.

2. The combined cycle power plant of claim 1, the spaced apart metal foam segments having an outer diameter and an inner diameter wherein the ratio of the metal foam segment outer diameter to the metal foam segment inner diameter is within a range of about 1.2 to about 10.

3. The combined cycle power plant of claim 1, the heat transfer tubes having a frontal spacing in the duct such that the ratio of the frontal spacing to the metal foam segment outside diameter is within the range of about 1.05 to about 2.

4. The combined cycle power plant of claim 3, the heat transfer tubes having an axial spacing in the duct such that the ratio of the axial spacing to the metal foam segment outside diameter is within the range of about 0.2 to about 1.5.

5. A method of configuring a combined cycle power plant heat recovery steam generator comprising the steps of:

configuring a duct to receive and confine gas turbine exhaust gas from at least one gas turbine;

disposing a series of heat transfer tubes in the duct such that the heat transfer tubes are configured to receive a water and/or steam therein; and applying to an exterior surface of the heat transfer tubes porous, axially extended surface of cellular metal foam such that the cellular metal foam is operable to increase heat transfer, when the heat transfer tube is exposed to the gas turbine exhaust gas, from the gas turbine exhaust gas to the water and/or steam, the cellular metal foam comprising a plurality of axially spaced-apart, axially extended metal foam segments having axially extending openings for engagement with the exterior surface of the heat transfer tubes; and configuring the metal foam segments to have an axial height such that the ratio of the metal foam segment axial height to the axial spacing therebetween is within a range of greater than 0 to about 50.

6. The method of configuring a combined cycle power plant heat recovery steam generator of claim 5 further comprising the steps configuring the metal foam segments to have an outer diameter such that the ratio of the metal foam segment outer diameter to the diameter of the axially extending openings is within a range of about 1.2 to about 10.

7. The method of configuring a combined cycle power plant heat recovery steam generator of claim 5 further comprising the steps of arranging the heat transfer tubes within the duct such that the ratio of the frontal spacing between the heat transfer tubes to the metal foam segment outside diameter is within the range of about 1.05 to about 2.

8. The method of configuring a combined cycle power plant heat recovery steam generator of claim 5 further comprising the steps of arranging the heat transfer tubes axially within the duct such that the ratio of the axial spacing to the metal foam segment outside diameter is within the range of about 0.2 to about 1.5.

* * * * *